May 23, 1939.  A. ALFORD  2,159,648

TRANSMISSION MODIFYING NETWORK

Filed Sept. 8, 1937  7 Sheets—Sheet 1

INVENTOR
ANDREW ALFORD
BY
E. D. Kinney
ATTORNEY

May 23, 1939.  A. ALFORD  2,159,648
TRANSMISSION MODIFYING NETWORK
Filed Sept. 8, 1937  7 Sheets-Sheet 2

INVENTOR
ANDREW ALFORD
BY
ATTORNEY

May 23, 1939.  A. ALFORD  2,159,648
TRANSMISSION MODIFYING NETWORK
Filed Sept. 8, 1937  7 Sheets-Sheet 3

INVENTOR
ANDREW ALFORD
BY
E. D. Phinney
ATTORNEY

May 23, 1939.  A. ALFORD  2,159,648
TRANSMISSION MODIFYING NETWORK
Filed Sept. 8, 1937   7 Sheets-Sheet 4

INVENTOR
ANDREW ALFORD
BY
ATTORNEY

May 23, 1939.   A. ALFORD   2,159,648
TRANSMISSION MODIFYING NETWORK
Filed Sept. 8, 1937   7 Sheets-Sheet 5

INVENTOR
ANDREW ALFORD
BY
ATTORNEY

May 23, 1939.   A. ALFORD   2,159,648
TRANSMISSION MODIFYING NETWORK
Filed Sept. 8, 1937   7 Sheets-Sheet 6

INVENTOR
ANDREW ALFORD
BY
ATTORNEY

May 23, 1939.                A. ALFORD                2,159,648
                    TRANSMISSION MODIFYING NETWORK
                    Filed Sept. 8, 1937         7 Sheets-Sheet 7

INVENTOR
ANDREW ALFORD
BY
ATTORNEY

Patented May 23, 1939

2,159,648

UNITED STATES PATENT OFFICE 2,159,648

TRANSMISSION MODIFYING NETWORK

Andrew Alford, New York, N. Y., assignor to Mackay Radio and Telegraph Company, New York, N. Y., a corporation of Delaware Application September 8, 1937, Serial No. 162,853

19 Claims. (Cl. 178—44)

This invention relates to transmission modifying networks used in conjunction with a high frequency source and a load or a passive circuit for altering the magnitude and/or phase of the transmission and/or reflections of the high frequency waves traveling between the source and the load. In its simplest embodiment this invention comprises a coupled network placed in the electromagnetic field of and in the proximity of a single conductor or two conductor transmission line which is connected to transmit energy from a source of high frequency alternating current to a load. The coupled network may be a simple section of a single conductor or two conductor line similar to the main single conductor or two conductor line to which it is coupled.

The coupled network introduces reflections, on waves of certain frequencies, transmitted over the transmission line to which the network is coupled and modifies the transmission of waves along that line. The magnitude and/or phase of the reflections and the modifications in transmission and the frequencies at which these reflections and modifications in transmission primarily take place depend on the form and dimensions of the coupled network and on the relative positions of the line and the network.

A principal object of the present invention is to provide a structure which may be used variously as a transformer, filter or a phase shifting device. Another object is to provide such a structure which shall be simple, economical, and well adapted for application to existing construction. A further object is to provide such a structure which may be applied to an existing line.

A further object of my invention is to provide a system comprising a transmission line and a coupled network which in combination acts as a means for modifying the transmission of high frequency waves along said line and in particular may serve as a filter, a transformer or a phase shifting device.

A still further object of my invention resides in a method for elimination of standing waves from transmission lines carrying waves of high frequencies of one or more frequencies.

In order to explain the nature of the present invention, a few embodiments thereof will be described without intending to limit the invention to the particular disclosures. As will be clear to those skilled in the art, the invention may be practiced by use of various other embodiments without departing from the spirit thereof as defined in the appended claims.

The drawings illustrate a few of the many possible applications of the invention, only so much being shown as is necessary for one skilled in the art to understand and practice the invention. Although an object of the invention has been outlined above, other uses and objects will present themselves upon reading of the particular description in connection with the accompanying drawings, in which Figs. 1 and 2 diagrammatically illustrate certain features of the apparatus.

Figure 1:
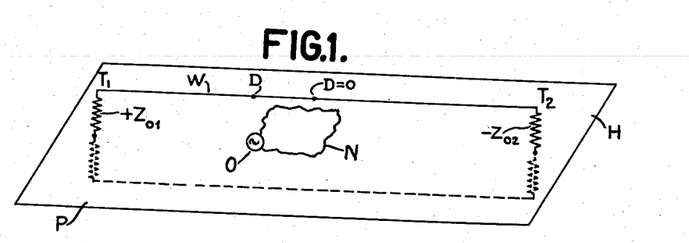

In order that the invention may be more easily understood reference is made to Fig. 1 which is a diagrammatic illustration of a high frequency circuit with which some of the principles of the invention will be explained. In this figure a straight single conductor W is mounted a short distance above and parallel to a perfectly conducting plane sheet P. Conductor W is terminated at its ends $T_1$ and $T_2$ into its surge impedance $z_0$.

Somewhere near the center of this conductor is placed a network N which is carrying high frequency currents produced by a source of E. M. F. located at O. Thus high frequency currents in the network are in general capable of producing an electric field which has a component $E_2$ along conductor W. The currents which flow at different points of network N are proportional to the current $i = i_0 \sin(\omega t)$ at some point in network; in which $\omega$ has the usual value of $2\pi$ times the frequency and $t$ represents time. In this arrangement the component of the electric field along the conductor may in all cases be expressed by the following equation, $$E_2 = i_0 a(D) e^{i(\omega t + \phi)} + i_0 a(D) e^{i(\omega t + \phi)} \quad (1)$$

Where $E_2$ is the component of electric field along conductor W which is induced by network N, $a$ is a function of the distance D along the conductor measured from some arbitrary point $D=0$, $\phi$ is a variable expressing the phase of the induced field along the conductor and is also a function of D, $\omega$ is $2\pi$ times the frequency and $t$ is the time.

It may be shown that the electric field given by Equation 1 produces the following current $i$ in conductor W:

$$i = \frac{i_0}{z_0}[\cos(\omega t + KD)\Sigma_1 - \sin(\omega t + KD)\Sigma_2 - \cos(\omega t - KD)\Sigma_3 + \sin(\omega t - KD)\Sigma_4] \quad (2)$$

where $$\Sigma_1 = \int a(D) \cos(\phi - KD) dD$$
$$\Sigma_2 = \int a(D) \sin(\phi - KD) dD \quad (3)$$
$$\Sigma_3 = \int a(D) \cos(\phi + KD) dD$$
$$\Sigma_4 = \int a(D) \sin(\phi + KD) dD$$

$K = \sqrt{LC\omega^2}$  $L =$ the inductance and C the capacity.

When the component $E_2$ of the electric field along conductor W is known and is expressed in the form given in Equation 1 then Equation 2 is a complete solution for the currents induced in conductor W. This solution is unique except for constants of integration, which must be determined from the boundary conditions. Before considering particular boundary conditions it is well to note that the induced current is composed of two traveling waves, one traveling from $T_1$ toward $T_2$ represented by the first two terms and the other traveling wave traveling from $T_1$ toward $T_2$, by the last two terms. The amplitude of the first wave is $$A_1 = \sqrt{\Sigma_1^2 + \Sigma_2^2} \quad (4)$$

and the amplitude of the second wave is equal to $$A_2 = \sqrt{\Sigma_3^2 + \Sigma_4^2} \quad (5)$$

These observations provide one with a method for taking into account particular boundary conditions which may be assumed. Useful deductions may be obtained by assuming that conductor W is very long, so that $E_2$ is negligible at its ends $T_1$ and $T_2$ which may be then said to be at $D = -\infty$ and $D = +\infty$. Since at $T_1$ the line has been assumed to be terminated into its surge impedance and since no E. M. F. exists at this point no waves can start from $T_1$ toward $T_2$, consequently the amplitude of the forward wave is zero at $T_1$ ($D = -\infty$) and similarly the amplitude of the back wave is zero at $T_2$ ($D = +\infty$). Accordingly, the amplitudes of the forward wave $A_2$ and of the back wave $A_1$ are equal to the values given in the Equations 3, 4 and 5 when the integrals are taken between the limits $D = -\infty$, and $D = +\infty$, and $D = +\infty$, and $D = -\infty$, respectively, that is, $$\Sigma_1 = \int_{+\infty}^{-\infty} a(D) \cos(\phi - KD) dD$$
$$\Sigma_2 = \int_{+\infty}^{-\infty} a(D) \sin(\phi - KD) dD \quad (3a)$$
$$\Sigma_3 = \int_{-\infty}^{+\infty} a(D) \cos(\phi + KD) dD$$
$$\Sigma_4 = \int_{-\infty}^{+\infty} a(D) \sin(\phi + KD) dD$$

From these equations it follows that, in general, $A_1$ and $A_2$ are not equal but under certain conditions, however, they are equal. This equality occurs when $$A(-D) = A(+D)$$
$$\phi(-D) = \phi(+D)$$

for all values of D.

In the general case where $A_1$ and $A_2$ are not equal, the currents near the ends of conductor W are not equal, in fact, $$at\, T_2\, i = i_{+\infty} = \frac{i_0}{Z_0} A_2 = S_2 i_0$$

and $$at\, T_1\, i = i_{-\infty} = \frac{i_0}{Z_0} A_1 = S_1 i_0 \quad (6)$$

hence $$S_2 = \frac{A_2}{Z_0} \text{ and } S_1 = \frac{A_1}{Z_0}$$

where $S_1$ and $S_2$ may be defined as the transfer coefficients between the network and conductor W for the forward and back waves, respectively.

In the special case where $A_1$ and $A_2$ are equal, $S_1$ and $S_2$ are also equal, and $$i_{+\infty} = i_{-\infty} = Si_0$$

so that the currents which flow in $T_1$ and $T_2$ may be expressed in terms of a transfer coefficient S and current $i_0$.

In this special case when $S_1 = S_2 = S$ there exists a simple and useful relation between the value of S and the resistance R which is induced in network N by the currents which the latter network induces in conductor W. For convenience resistance R will be called the induced resistance.

In general current $i_0$ in network N flows against an impedance which consists of two parts, namely, $r + jx$ which is the impedance of network W itself and the induced resistance R. The total impedance against which current $i_0$ flows is the sum of these two parts, that is, $r=jx+R$. Accordingly, by Ohm's law, $$i_0 = \frac{E}{r+jx+R} \quad (7)$$

where $E$ is the electromotive force applied at point $O$ of network $N$.

The work which current $i_0$ does against $r$ and which is equal to $i_0^2 r$ is dissipated as heat in network $N$. On the contrary, the work which current $i_0$ does against the induced resistance $R$ is converted into heat in the terminations of conductor $W$, i. e., at $T_1$ and $T_2$. The energy delivered to the latter points is equal to $$Z_0 i_{\infty}^2 + Z_0 i_{-\infty}^2 = 2Z_0 S^2 i_0^2$$

From the law of conservation of energy it follows that $$R i_0^2 = 2 Z_0 S^2 i_0^2$$

and hence that $$R = 2 Z_0 S^2 \quad (8)$$

Thus:

$$i_0 = \frac{E}{r+jx+2Z_0 S^2} \quad (9)$$

$$i_{-\infty} = \frac{SE}{r+jx+2Z_0 S^2}$$

These equations take into account the reaction of the currents produced in conductor $W$ on inducting network $N$.

Figure 2:
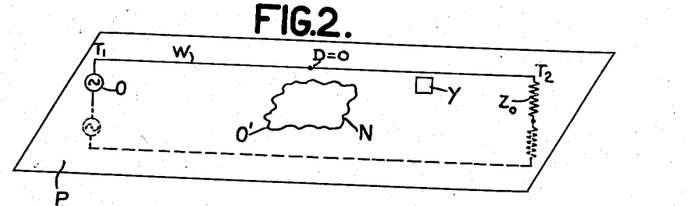

In accordance with the well known general reciprocity law the electromotive force $E$ applied at $O$ and current $i_{-\infty}$ through termination $T_1$ may be interchanged. When this is done the arrangement shown in Fig. 2 is obtained. In this figure the E. M. F. $E$ is applied in series with $z_0$ at $T_1$ and the current $i_n$ which flows at point $O'$ of network $N$ in accordance with the aforementioned application of the reciprocity law is equal to $$i_n = i_{-\infty} = \frac{ES}{r+jx+R} \quad (10)$$

From the principles already discussed in connection with Fig. 1, it follows that current $i_n$ flowing in network $W$ results in two traveling waves, one proceeding toward $T_1$ and the other proceeding toward $T_2$. In the present case $S_1 = S_2 = S$ so that the amplitudes of these two waves are the same and each is equal to $S|i_n|$.

Figure 3:
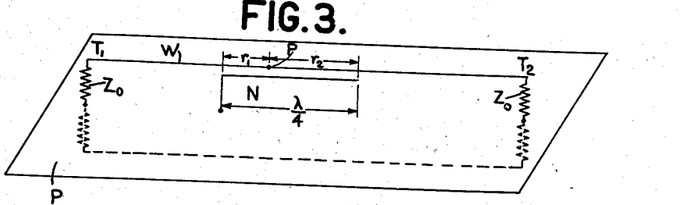
Fig. 3 illustrates for purposes of explanation the relationship of Figs. 2 and 3 for use with a two conductor line.

The amplitude of the forward wave which starts from $T_1$ toward network $N$ in the arrangement of Fig. 3 is quite independent of the action of this network and is always equal to $$\frac{E}{2z_0}$$

Therefore the ratio $M$ of the amplitude of the back wave, which proceeds toward $T_1$, to the amplitude of the forward wave, which proceeds from $T_1$, is given by $$M = \frac{2S^2 Z_0^2}{|r+jx+2S^2 Z_0|} \quad (11)$$

This ratio $M$ is numerically equal to the amplitude of the back wave when the amplitude of the forward wave is unity. For convenience ratio $M$ will be designated the coefficient of reflection.

The interference of the forward and the back waves along the section of conductor $W$ between $T_1$ and network $N$ results in a standing wave pattern. The standing wave ratio $q$ or the ratio of $i_{max}$, the current at current loops to the $i_{min}$, the current at current nodes may be expressed in terms of $M$ by the following equation:

$$q = \frac{1+M}{1-M} \quad (12)$$

The distance $P$ between a current loop and the reference point $D=0$ along conductor $W$ cannot be given by a general formula which is applicable to all cases. It is useful, however, to observe a simple relation which exists between the position of current loops and the phase of the back wave. When the phase of the back wave is advanced the current loops move toward $T_1$ and conversely when the phase of the back wave is delayed the current loops move away from $T_1$. If $P$ is expressed in electrical degrees then a change in $P$ is numerically equal to one half of the change in phase of the back wave, also expressed in degrees. Since the back wave is produced by current $i_n$ in network $W$ the phase of the back wave depends on the phase of this current. Accordingly if the phase of this current is varied for example by changing the value of reactance $X$ of network $N$, the phase of the back wave varies by the same amount and the distance $P$ expressed in electrical degrees varies by one half of this amount. The phase of $i_n$ may be varied, for example, by changing reactance $X$ of network $N$. When this is done distance $P$ varies in accordance with the following relation:

Change in $P$ (in electrical degrees) is equal to one-half of the change in $$\tan^{-1} \frac{x}{r+2Z_0 S^2} \quad (13)$$

When the value of $r$ is known and the value of $x$ may be computed, this relation between the position of the standing waves and the ratio of reactance to resistance, enables one to determine the value of $S$ by experiment, which consists of a measurement of the shift in position of a standing wave minimum caused by a known increase or decrease of $x$. The absolute position of the current loops for a given value of $x$, cannot be predicted without taking into account the particular form of the network $N$ but once this position is known for one value of $x$, all others may be immediately calculated from the values $r$, $x$ and $S$, given above.

The measurement of $r$, the resistance of the network, may be readily made since this quantity may be obtained once and for all for a particular form of network $N$, by placing the network at a great distance from conductor $W$ so that $2Z_0 S^2$ has a very small and negligible value and by observing the value of the network current $i_n$ for different and known values of $x$.

While the transfer coefficient may always be measured it is often convenient to calculate it. This is particularly true when the expression for $E_2$ is relatively simple and the integrals in Equation 1 may be readily evaluated. Such is, for example, the case when the inducing network $N$, as illustrated in Fig. 3, consists of a quarter-wave wire which is insulated at one end and is connected to the conducting sheet $P$ at the other end. This wire is parallel to the conductor $W$ and is at the same height above the sheet. The height above the sheet is assumed to be only a small fraction of the total length of the wire so that the horizontal portion may be considered to be nearly a quarter-wave length long.

The inducing current in the quarter-wave wire is assumed to consist of two-traveling waves of equal amplitude, one of which travels toward the insulated end and is referred to as the forward wave, and the other travels away from the open end and is referred to as the reflected wave. The electric field due to the traveling wave which traverses a wire of length $l$, has been derived elsewhere (see A. Alford "A Discussion of Networks for Calculating Electromagnetic" in "Electrical Communications" for July, 1936). When the fields due to the network and its image in the sheet are expressed in the form given in Equation 1 and integrals in Equation 3a are evaluated and negligible terms are neglected, the following approximate formula for S is obtained $$S = \frac{60}{Z_0} \log_e \frac{r_2}{r_1}$$

where $r_1$ is the distance between the quarter-wave wire and conductor W and $r_2$ is the distance between the image of the quarter-wave wire and conductor W and $Z_0$ is the surge impedance of conductor W in ohms.

The above deductions have all been worked out with respect to a single wire conductor W. These deductions, however, apply without modification to balanced two-wire transmission lines, such as are more frequently used in practice. This is true, since the arrangement which has been considered is equivalent to exactly one-half of a two-wire line, with the perfectly conducting sheet taking the place of a neutral plane which bisects the distance between the two conductors of a balanced two-wire line. The surge impedance of the two-wire line will be just double the surge impedance of the single wire above the sheet. The only other consideration is that another physical network N must be added to replace the image in the conducting sheet. Thus, for example, the above deductions apply to the arrangement illustrated in Fig. 4A. In this figure 2 are the conductors of a balanced transmission line, 1 is a source of high frequency power of wavelength $\lambda$, 3 is a load, the impedance of which is equal to the surge impedance of the transmission line 2—2 and 4 is a coupled network. The coupled network 4 is substantially a section of transmission line of the same general construction as the main line 2—2. This section of the transmission line 4 is short circuited at one end by short circuiting wire 5 and is open circuited at the other end. The section of line 4 is in a plane parallel to the plane through conductor 2—2 and is directly below said conductors at a distance H. The wavy line 6 and the straight line continuation 7 diagrammatically show the distribution of current along the main line 2—2 which results when the length $l$ of the coupled section 4 is in the neighborhood of one-quarter of wavelength $\lambda$.

The value of the transfer coefficient S for such a section with reference to the loop current $i_0$, that is, with reference to the current in the short wire 5 is given by $$S = \frac{60}{Z_0} \log_e \frac{\sqrt{H^2 + d^2}}{d}$$

Figure 4A:
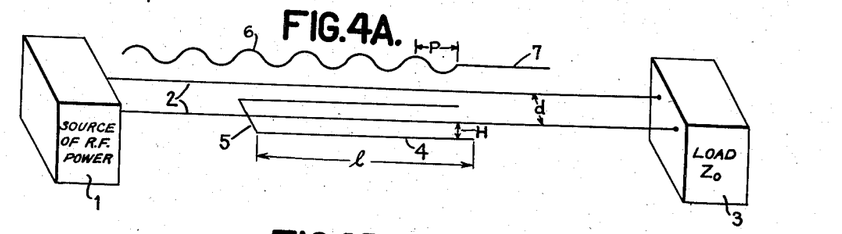
Figs. 4A and 4B illustrate a coupled section coupled to a transmission line connected between a source of power and a load.
Figure 5:
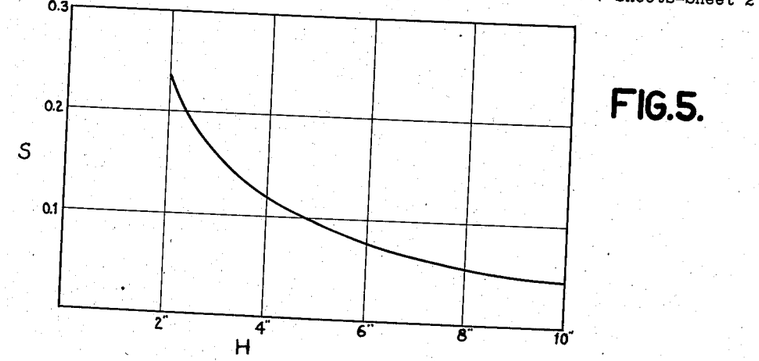
Figs. 5, 6 and 7 are curves illustrating certain principles of the apparatus.

Fig. 5 shows how S of network in Fig. 4A, in a typical case, varies with H, when $d = 12$ inches and the surge impedance $Z_0 = 600$ ohms. In this figure both H and d are expressed in inches.

Figure 6:
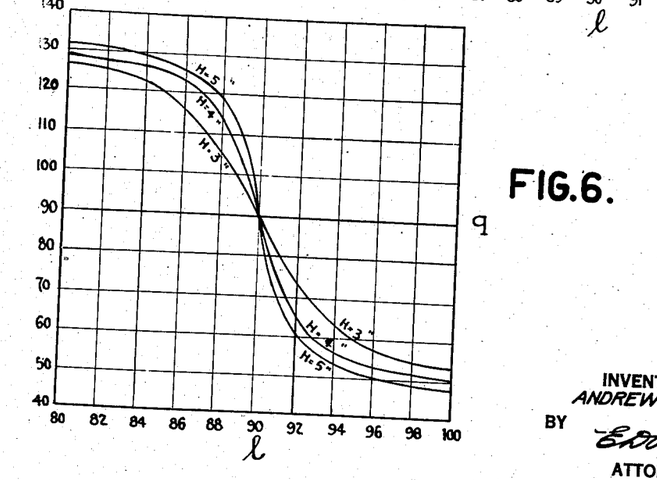

Fig. 6 shows how P, the distance between a current loop and the point just above the insulated end of the section varies with the length $l$ of the section. For convenience both $l$ and P are expressed in electrical degrees. In calculating the curves of this figure, the resistance of the section has been assumed to be equal to .69 ohm which is typical of the values found in practice for networks such as shown in Fig. 4A when made of copper wire .162 inch in diameter and measured at frequencies of order of 10 megacycles. The curves shown in Fig. 6 were calculated from e. g. (13) together with the additional fact which follows from Equations 2 and 3a, and which is easily verified by experiment, namely, that when the reactance of section 4 is zero $P = 90°$.

Figure 7:
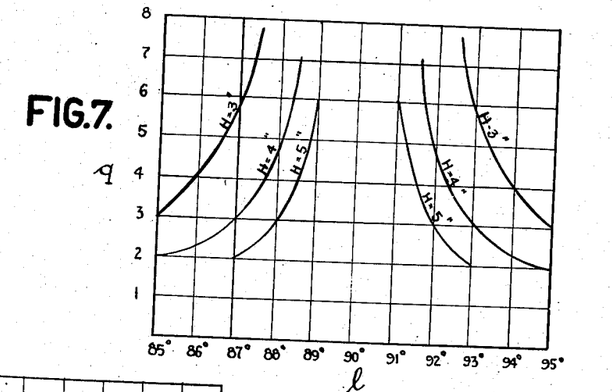

Fig. 7 shows how the standing wave ratio $q$ of the standing waves caused by the coupled section varies with $l$. These curves were calculated from Equation 12. The value of resistance $r$, which was assumed in calculating these curves was the same as that assumed in connection with Fig. 6. It may be seen from Fig. 7 and from Equations 12, 11, that a wide range of values of $q$ may be produced by the coupled network in the arrangement of Fig. 4A.

Figure 4B:
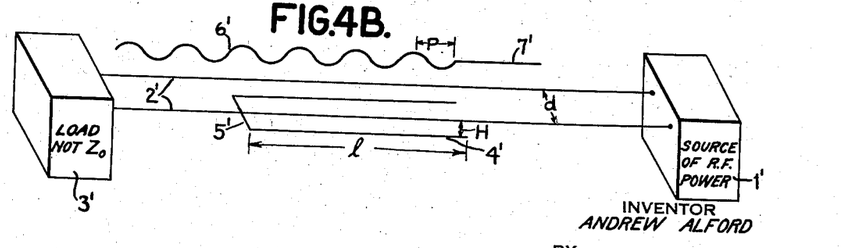

The fact that a coupled network can produce a wide range of value $q$ in a transmission line in the arrangement of Fig. 4A, has an immediate practical application to matching of the impedance of a load to the surge impedance of a transmission line as well as to other practical uses. These applications are based on the following theorem which is referred to as the reciprocity law for standing waves. This law holds for networks in which the dissipation is negligible. The proof of this theorem is quite lengthy and is omitted but the result is stated in connection with Figs. 4A and 4B. Fig. 4B shows an arrangement which is similar to the arrangement of Fig. 4A except that in Fig. 4B the standing waves diagrammatically illustrated by wavy line 6' are produced not by the coupled network but by the load 3', the impedance of which is not equal to the surge impedance of the transmission line. The straight continuation 7' of the wavy line 6' shows that there are no standing waves along the portion of the transmission line between the source of high frequency power 1' and the coupled section. In this arrangement of Fig. 4B, the coupled network acts as an impedance matching device which eliminates standing waves caused by a mismatch at the load end of the transmission line. This action of the coupled network in the arrangement of Fig. 4B is an exact counterpart of the action of the same network in Fig. 4A in which the transmission line was matched at its load end and the standing waves were produced by the network.

The relation between the two arrangements shown in Figs. 4A and 4B may be called the reciprocity law for standing waves which may be stated as follows:

If a non-dissipative network, which in arrangement of Fig. 4A produces standing waves of ratio $q$ and a position parameter P is coupled to a line in which there exists standing waves of the same ratio $q$, as in Fig. 4B, and is positioned at such a place that the distance between the network and one of the current maxima is equal to P, then the network produces a reflectionless line.

When a network is asymmetric in some respects, for example as in Figs. 4A and 4B, so that its oscillator end in arrangement of Fig. 4A differs from its end near $Z_0$, the theorum still holds, provided that in transferring the network into the arrangement shown in Fig. 4B, the network is reversed so that its oscillator end in Fig. 4A points to the land in Fig. 4B.

In view of this law the problem of eliminating standing waves from a given transmission line by means of coupled networks may be solved as is illustrated by the following example. Let it be assumed that it is required to eliminate from a long transmission line with 600 ohm surge impedance which feeds a load which for instance may be an antenna. The first step is to determine the standing wave ratio $q$ and the position of a current loop along the line in the neighborhood of the load. This may be done, for example, by means of slide wire meter well known in the art. Let it be assumed for the sake of illustration that the value of $q$ determined by means of the slide meter is equal to 3.0. The next step is to select a coupled network which in arrangement of Fig. 4A (or Fig. 2) produces standing waves of standing wave ratio $q=3.0$. Such a selection may be made from curves such as are shown in Fig. 7 for a quarter wave coupled network. Similar curves may be drawn for other forms of coupled networks by using the principles described in this specification. From Fig. 7 it may be seen that a number of coupled sections of different dimensions would produce standing waves with $q=3.0$ in the arrangement of Fig. 4A. For example, a section with $H=3''$, $l=84.5°$ or a section with $H=4''$, $l=86.8°$ any one of these various coupled sections may be selected. After one of these sections is chosen, the position of this network with respect to the position of the current maximum of standing waves which was determined by means of the slide wire meter may be obtained from curves such as are shown in Fig. 6 for a quarter wave coupled network. Similar curves for other forms of coupled networks may be shown by using the principles described in this specification.

From Fig. 6 it may be seen, for example, that the quarter wave coupled network with $H=3''$, $l=84.5°$ should be installed at distance $P=120°$ from the current maximum. From the same figure it may also be seen that the quarter wave section with $H=4''$, $l=86.8°$ should be installed at distance $P=120°$ from the current maximum, etc.

If the quarter wave section with $H=4''$, $l=86.8°$ is selected and installed at distance P from the current maximum in that orientation which is prescribed by the reciprocity law for standing waves already explained in connection with Figs. 4A and 4B, it will be found that the standing waves along the portion of transmission line between the network and the source of high frequency power will be eliminated.

In practice because of the effects of insulators and the so-called end effects, the length $l$ of the coupled quarter wave section usually made 6 or 12 inches shorter than that which is calculated in order that the coupled section will produce the results predicted from the theory. Such a change in length $l$ of the section may be readily made in practice by merely moving the shorting bar 5', shown in Fig. 4B toward the open end of the section. The position of the section with respect to the standing waves given by curves such as are shown in Fig. 6 is usually sufficiently accurate for practical purposes, except for small final adjustments which are sometimes required to compensate for error introduced by application of the reciprocity, which strictly applies only to ideal dissipationless networks, to coupled networks which, of course, have a small but a finite value of resistance.

Figure 21:
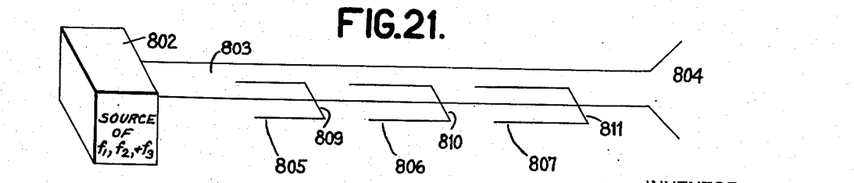
Fig. 21 illustrates an application of the network for matching a transmission line at a plurality of frequencies.

In making a selection of a particular network from curves such as are shown in Fig. 7, it is well to keep in mind the following principles. The current which is produced in the network in the arrangement of Fig. 4B, in which the coupled network acts as a matching device depends on the value of the transfer coefficient S of the network and consequently on the distance H between the network and the line. The larger is this distance H the smaller is the transfer coefficient S and the greater is current which must flow in the coupled network to produce the desired effect. Since the resistance $r$ of the coupled network is never equal to zero, the energy which is wasted in this network increases as the network current is increased. For this reason the loss in coupled networks with large values of S and consequently small values of H is very small, but the loss in networks with small values of S, that is, large values of H may be excessive. For this reason it is advisable to select among the coupled networks which produce the required value of $q$, that network which has the greatest value of S (least value of H) which is consistent with other requirements which the network may have to satisfy at the same time, for example, when it is used on a transmission line which carries several different frequencies, as will be explained in detail in connection with Fig. 21. In this Fig. 21, 802 is a high frequency source producing three different high frequencies $f_1$, $f_2$ and $f_3$ connected over a transmission line 803 to a load 804 which may be a transmitting antenna. Coupled to this line are three networks 805, 806 and 807, these networks being adjusted to match the line separately at frequencies $f_1$, $f_2$ and $f_3$. With this arrangement the three frequencies may be simultaneously or alternatively transmitted to antenna 804 without any change in the circuit. The system may be constructed by applying these frequencies to the line one at a time and designing and erecting the respective networks to match the line at that frequency, in accordance with the principles already explained in detail in connection with Fig. 4B. For example, $f_1$ may be introduced into the line element 805 just as though $f_1$ was the only frequency to be transmitted. Subsequently frequencies $f_2$ and $f_3$ may be separately applied to the line and the networks 806, 807, respectively, similarly adjusted to match the line at these two frequencies. Should it become desirable to use the line for still other frequencies, additional network units may be added.

When selecting the values of S and therefore H for the various coupled networks such as 805, 806, 807, in the system of Fig. 21, it should be kept in mind that a coupled network which matches the line at one of the frequencies should produce negligible disturbance at other frequencies. This condition may be obtained by selecting a value of S, (more specifically the value of H in the case of quarter wave sections) so that the value of $q$ which the network produces at other frequencies to be transmitted along the line is sufficiently low. That this is possible may be seen, for example, from Fig. 7 which shows the relation between $q$ and the length of a section in electrical degrees. From this figure it may be seen that a coupled section which is designed to match at a frequency $f_1$ will have an electrical length not greatly different from 90°, at any other frequency $f_2$ having sufficiently different H from $f_1$. The electrical length $l$ of the network will differ considerably from 90° and therefore, as may be seen from this figure, if a sufficiently large value of H has been selected the $q$ of the network at frequency $f_2$ will be so close to unity as to cause a negligible disturbance.

In practice it is found that when the ratio of frequencies $$\frac{f_2}{f_1}$$

is greater than 1.04 and the standing waves to be eliminated from the line have a ratio not greater than 5, it is possible to select a set of networks which produce negligible disturbance at frequencies other than those at which they are designed to produce a match and at the same time introduce negligible losses into the transmission line.

When it is desired to work with frequencies the ratio of which is close to unity or to eliminate standing waves with a very large $q$, it is preferable to construct the coupled networks of wire or copper tube of large diameter in order to decrease the losses.

While so far specification applications of coupled networks of the form illustrated in Figs. 4A, 4B and 21 have been described, other forms of coupled networks may be employed for achieving the objects of this invention. A few examples of the form which coupled networks may take will be described in what follows.

Figure 8:
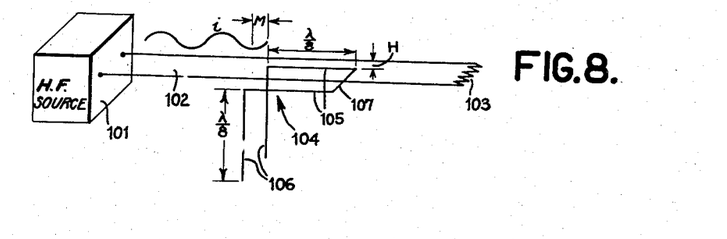
Fig. 8 illustrates one form of the network coupled to a transmission line.
Figure 8A:
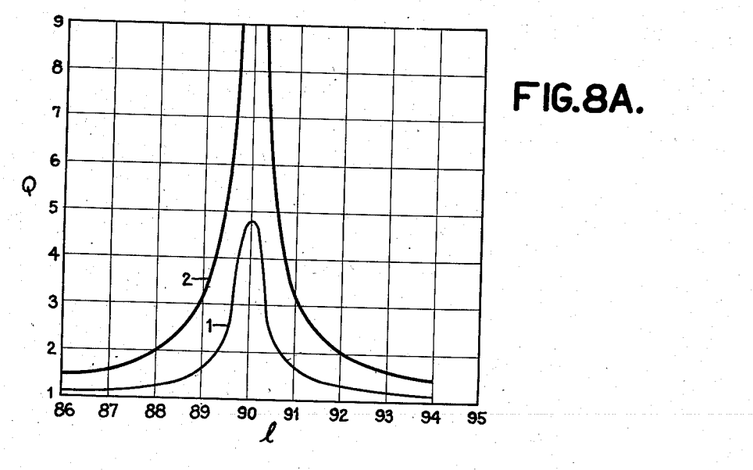
Figs. 8A and 8B illustrate curves relative to test data observed in connection with a circuit similar to that illustrated in Fig. 8.
Figure 8B:
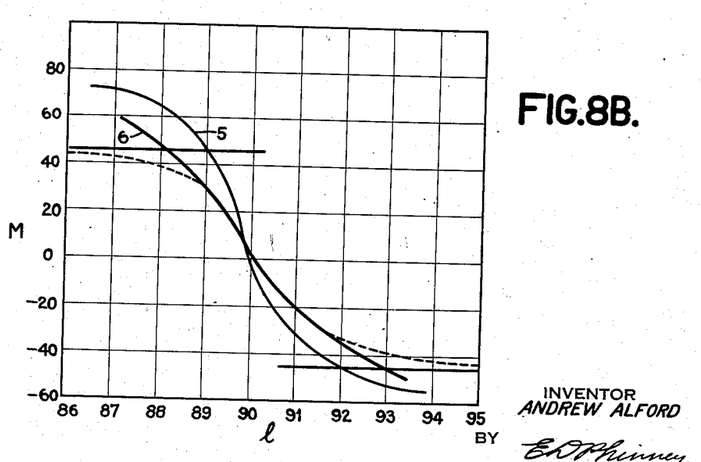

In Fig. 8 is shown a high frequency source 101 connected through transmission line 102 to a load 103 which may be an antenna. At some point along the transmission line intermediate the source and the load there is coupled the network indicated generally at 104. This network comprises a horizontal portion parallel to the transmission line 105 and a vertically disposed portion 106, and an adjustable shorting bar 107 connected across the portion 105 remote from the vertical section 106. The vertically disposed portion 106 of the coupled network 104 may be made, for example, equal to ⅛ of the wavelength. In case the network produces maximum effect on the transmission of waves along the transmission line 102 when the length of the horizontal portion 105 is approximately also equal to ⅛ of the wavelength. The constants of such networks may be calculated in accordance with the principles and with aid of the equations already given. These constants may also be obtained experimentally by placing the network in arrangement similar to that shown in Fig. 4A. In Figs. 8A and 8B are shown curves obtained by actual measurement in this manner with networks of Fig. 8. In Fig. 8A the ordinate axis labeled Q is the $i_{max}$ to $i_{min}$ ratio of the standing waves upon the transmission line and the abscissa is the overall length $l$ of network 104 in electrical degrees at the particular wavelength $\lambda$. The curve 1 indicates the relation between Q and $l$ when the spacing H equals seven inches, and curve 2 the corresponding relationship when the distance H is chosen as four inches.

In Fig. 8B the distance of standing wave minimum from the conductors 106, M is plotted as ordinate against the overall length $l$ of element 104 as abscissa. In this figure curve 5 represents the relation between M and $l$ at H equals seven inches, and curve 6 represents the relation of M and $l$ at H equals four inches. In this figure M is the distance measured in electrical degrees from the point of junction of portions 105 and 106 of network 104 of Fig. 8.

Figure 9:
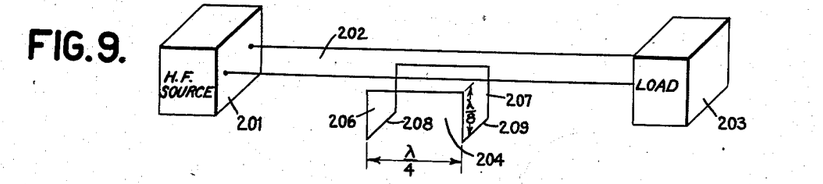
Fig. 9 illustrates another form of coupled networks associated with a high frequency line.

In Fig. 9 is illustrated another form of coupled network. In this figure 201 represents a source of high frequency energy connected over line 202 to a load 203. The coupled network 204 comprises a horizontal branch 205 and two perpendicularly related branches 206, 207 connected thereto. Across the arms 206, 207 are inserted adjustable short-circuiting bars 208, 209. The behavior of this form of coupled network is illustrated in Fig. 9A in which the curves were obtained from actual measurements made with networks of Fig. 9.

Figure 9A:
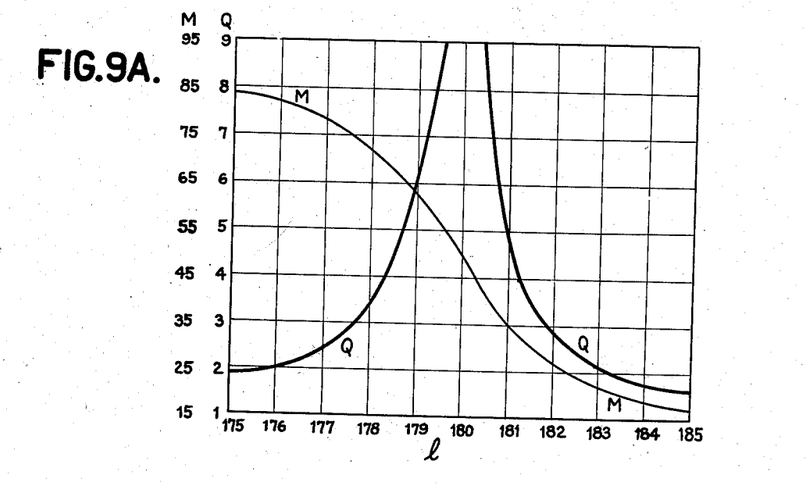
Fig. 9A shows test curves obtained with an embodiment similar to that illustrated in Fig. 9.

In Fig. 9A the curve $5_2$ represents the distance from standing wave minimum to the network connection M plotted against overall length $l$ for H equals seven inches, similarly to the showing in Fig. 8B.

Figure 10:
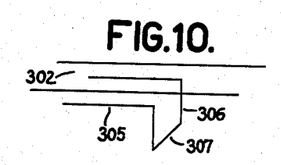
Figs. 10 to 15 illustrate several other forms of the coupled network.

In Fig. 10 is shown a coupled network similar in form to that illustrated in Fig. 8. However, in this figure the short-circuiting bar 307 is placed across the vertical down-leading section 306 instead of the horizontal portion 305. This network coupled to a line such as 302 produces an effect similar to that which is produced by network of Fig. 8.

Figure 11:
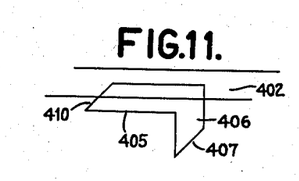

In Fig. 11 is shown a network somewhat similar to that of Fig. 10. However, in this figure the horizontal arm portion 405 has been extended one-quarter of a wavelength and a short-circuiting bar 410 placed across this point as well as across the point 407 in vertical section 406. This circuit operates similarly to the circuits such as shown in Figs. 8 and 10.

Figure 12:
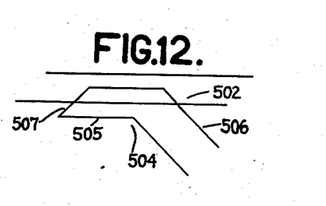

Fig. 12 shows a network 504 coupled to a line 502. This coupled element is similar to that shown in Fig. 8 except that the down-lead portion 506 is not made perpendicular to the horizontal portion 505. The properties of this network are similar to those of the network shown in Fig. 8 particularly if adjustments in the lengths are made to take care of the difference to the angular relation shown.

Figure 13:
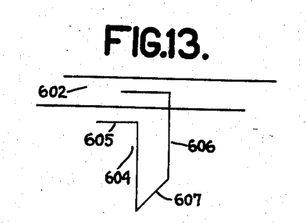

In Fig. 13 is illustrated a network in which the horizontal portion 605 parallel to the transmission line 602 is made very short. In this case the coupling between the network and the transmission line approaches a small capacity coupling. This is a special case since in general the coupling between coupled networks and the transmission line is electromagnetic.

Figure 14:
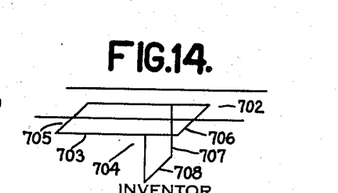

In Fig. 14 there is shown still another form of coupled network. In this figure the transmission line 702 has coupled to it a network 704 which comprises conductors 703, arranged parallel to the transmission line and provided with short circuiting bars 705, 706. At a point intermediate 705, 706 is connected a depending portion 707 which is provided with a short-circuiting bar 708. The conductors 703 and the conductors of depending portion 707 may be extended indefinitely since the currents in the network do not penetrate beyond the shorts except to a very small extent. In extending the conductors beyond the shorts caution is to be exercised in order to avoid the extended conductors together with one of the shorts from becoming another coupled network of low reactance in which considerable current may be present and which would produce an undesirable reaction on the line. In order to avoid such a phenomenon the wires extended beyond the coupled network proper may be shorted every quarter or every three-eighths of the wavelength. This procedure insures that the incidental coupled networks acquire such high reactances that no appreciable current can circulate in them so that they can produce no substantial effect on the waves in the transmission line. The dimensions of the network 704 should be such that the reactance of the network, measured for example at a point along short-circuiting bar 705 where the latter is imagined to be cut in two for that purpose, should be fairly low in order that currents may be induced. The reactance of the network 704 may be adjusted to any desired value including zero by moving the shorts 705, 706 and 707. This network has the advantage in that it may be installed without the use of any insulators and has another advantage in that by shifting the shorts 705, 706 and section 707 along the wires 703 of the network the whole network may be shifted. This sometimes simplifies both construction and adjustments because wires 703 may be stretched out tight between supports once and for all and the shorts 705, 706 and section 707 added later.

In order that the action of the more complicated coupled networks such as, for example, the network of Fig. 14 may be more easily visualized the following theoretical observations are added. The currents in a coupled network are produced by the electric field of the transmission line. This electric field of the transmission line at any point in space may be resolved into two components, one which is parallel to the conductors of the transmission line and one which is perpendicular to these conductors. The first of these components may be called the parallel field while the second component is called the radial field. It may be shown that the parallel field at any point near a long straight transmission line, carrying travelling waves and which has no ends or bends near the point, is quite small. On the contrary the radial field at such a point is relatively quite large. For this reason the electromotive force which produces currents in coupled networks such as are shown in Figs. 4A, 4B, 8, 9, 10, 11 and 14 is caused by radial component which can act only on shorting bars or bends. Accordingly the induced electro-motive force which produces the current in the coupled section of Fig. 4B is located in the shorting bar of this section. Similarly the electro-motive force which produces currents in Fig. 8 is located in near the bend in the vertically disposed portion of coupled network of Fig. 8. Similarly in the network of Fig. 14 there are three separate and simultaneous sources of electro-motive forces, namely, one in shorting bar 705, another in shorting bar 706 and still another in the vertical wires of portion 707 near the junction with 703. The electromotive force induced in shorting bar 708 is usually too small to have much effect when portion 707 is long in comparison with the spacing of the transmission line conductors. It may also be shown that the parallel field near a shorted end of a section of transmission line is quite small and that the parallel field near an open end or bend is relatively very large. It is for this reason that the standing waves in Fig. 4A start from a point just above the open end of the coupled network where the parallel component of the field due to the network is localized and is inducing an electromotive force, in the transmission line conductor, which in turn produces the back wave. Similarly, back wave produced by network of Fig. 8 starts just above the bend in the coupled section. Similarly the back wave due to the network of Fig. 14 starts above the point where vertical portion 707 is connected to conductors 703. In the network of Fig. 9 there are two bends and two back waves start along the transmission line, one above each bend.

Figure 15:
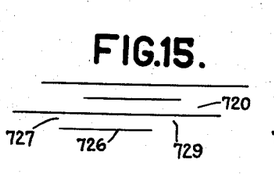

From this discussion it follows, for example, that in a coupled network such as is shown in Fig. 15 which consists of two open ended wires there can be induced no current because there is neither a short nor a bend in which an electromotive force can be produced by the radial component of the electric field of the transmission line. When such network is placed near a bend in the transmission line, however, there is electrical dissymmetry and a substantial component of the electric field parallel to the conductors of the section near the bend in the line and large amounts of current may be produced in the coupled section with the attendant reaction on the transmission of currents along the line.

Figure 16:
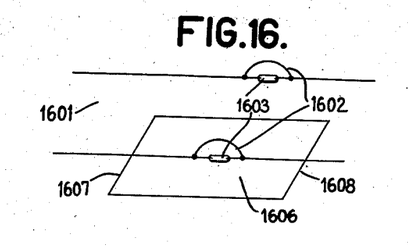
Figs. 16 and 17 illustrate still other forms of the invention.

In Fig. 16 is shown another form of coupled section. In this figure the transmission line is indicated at 1601 and the coupled network is indicated generally at 1606. In this instance the network is provided with short-circuiting bars 1607 and 1608 at opposite ends thereof. Such a coupled section has substantially no effect on the transmission of waves along the line providing that waves travel along the line with the same speed as along the network. This is because the reactance of such a section is quite large except when the section is approximately a whole number of half wavelengths long when the electromotive forces which are induced in the two shorting bars have such phases as to counteract each other. Accordingly, in order to use such a network some means for introducing electrical dissymmetry, e. g., shifting the phase of waves must be introduced into the transmission line. This is done in Fig. 16 by introducing additional lengths in the line indicated by loops 1602 which are looped around the insulators 1603. These additional lengths of line introduce a phase displacement in the line with respect to the coupled network 1606 and thus render the network effective for its needed purposes.

Figure 17:
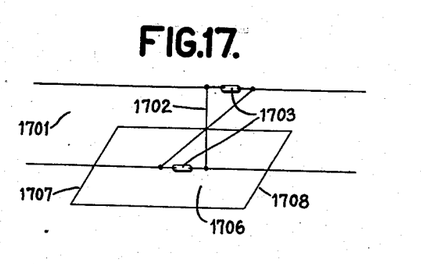

In Fig. 17 is shown another circuit in which a network closed at both ends is indicated generally at 1706, provided with the short-circuiting bars 1707 and 1708. This network is mounted immediately adjacent a transmission line 1701. In order to provide the necessary phase shift to produce electrical dissymmetry the transmission line is broken by insulators 1703 and the two conductors of the line are transposed, as indicated at 1702. This transposition of the conductors introduces the necessary phase shift for the proper functioning of the coupled network.

Figure 18:
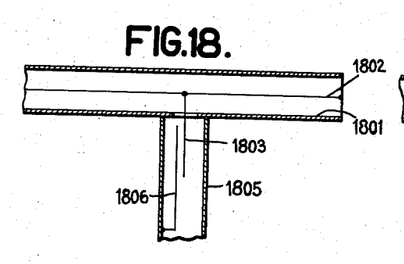
Figs. 18 and 19 illustrate two forms of the invention which may be applied to concentric tubular conductors.

Coupled networks may be applied to other forms of transmission line, such as, for example, concentric conductors. In Fig. 18 is illustrated one form of coupled section used as a concentric cable. In this figure the transmission line comprises an outer conductor 1801 and an inner concentric conductor 1802. At some point the outer conductor is apertured and through this aperture a conductor 1803 is connected to inner conductor 1802. About this conductor is placed a short length of outer concentric conductor arranged perpendicularly to the outer conductor 1801. This conductor 1801 comprises an outer conductor 1805 and an inner concentric conductor 1806. The inner conductor 1806 is conductively connected with the outer tubular portion and is coupled with conductor 1803 by being arranged in insulated close proximity thereto.

Figure 19:
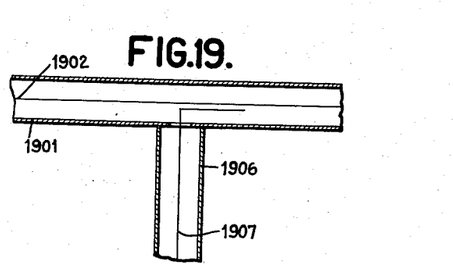

Another form of coupled section which may be used with concentric cables is illustrated in Fig. 19. In this figure a concentric conductor comprises an outer conductor 1901 and an inner conductor 1902 is illustrated. Perpendicularly arranged to this outer conductor is provided another section of concentric line comprising an outer conductor 1906 and an inner conductor 1907. The outer conductor is conductively connected with the outer conductor 1901 and the inner conductor 1907 extends through an aperture in conductor 1901 to a point adjacent conductor 1902 and from there along parallel to the conductor 1902 for the desired distance.

While only these two illustrations of coupled network applied to concentric lines are illustrated, it is evident that any other forms may be devised within the purview of my invention.

Figure 20:
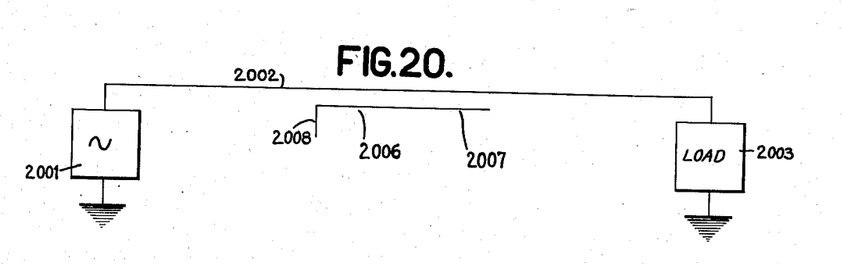
Fig. 20 illustrates a network in accordance with the invention coupled to a single wire line.

In Fig. 20, I have illustrated an application of the coupled network to a single wire line. In this figure a high frequency source is indicated at 2001 connected over a single transmission line to 2002 to a load 2003, the other side of both the load and the source are connected to a flat conductor. Immediately adjacent conductor 2002 is arranged the coupled section 2006 comprising a horizontal portion parallel with the transmission line 2007 and a short depending portion 2008. In this arrangement the transmission line with its image in the flat conductor and the coupled network with its image operate in substantially the same manner as does the system using two wire transmission lines.

It is clear that many other forms of single wire transmission lines and networks may be devised similar to those illustrated in connection with the two wire lines in the figures described above.

Figure 22:
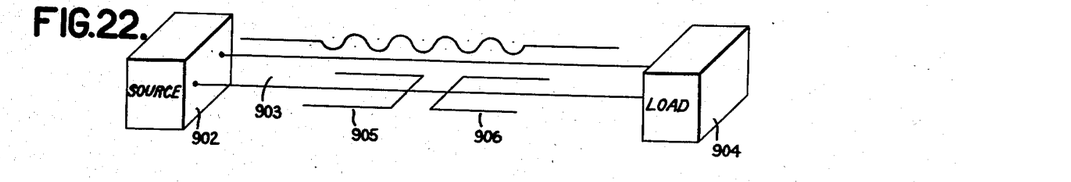
Fig. 22 illustrates an example of coupled networks used in conjugate relationship.

In Fig. 22 an application of coupled networks for the purpose of phase changing is illustrated. In this figure 902 represents a source of high frequency energy coupled to a line 903 and to a load 904. If for some reason it is desirable that the phase of the energy introduced into 904 be adjusted, as for example, if waves of two different frequencies are to be delivered thereto and one of the waves delayed or advanced in phase this adjustment of phase may be made by using two networks coupled to the line. Accordingly I have shown two networks 905, 906 coupled to the line similarly to the other showings in the drawings. Network 905 may be adjusted so as to introduce reflections producing standing waves on line 902 and 906 may then be adjusted and positioned so as to match the line and remove the standing waves. By proper adjustment of the networks the phase of the waves may be regulated so as to produce any desired phase delay or advance at load 904. Thus it is made possible to produce a phase delay or advance of waves of one frequency without affecting the phase of waves of another frequency transmitted over the same line.

Figure 24:
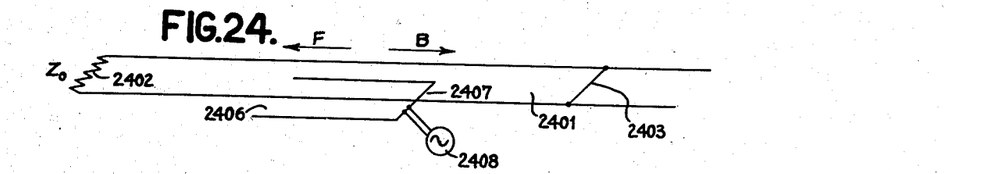
Figs. 24 and 25 illustrate the use of coupled networks in accordance with my invention, connected to a line so as to operate as selective filters.

In Fig. 24 is illustrated another use of the network which is outlined above. In this figure to the transmission line 2401 there is coupled a network 2406. Across the network near the short-circuiting bar 2407 is connected a source of high frequency energy 2408. The point at which the source 2408 is connected may be so adjusted that the impedance looking into the network at this point matches the impedance of the source of the surge impedance of a transmission line which is used to connect the source so that an efficient transfer of energy is obtained. Such condition requires proper adjustment of the length of the coupled section as well as the position of the points at which the source is connected. In practice these adjustments may be made by process of successive approximations, which may be greatly simplified by first adjusting the length of the section so that the impedance seen by the source is substantially resistive and sliding the points of connection so that this impedance is either decreased or increased to the proper value. The transmission line is terminated into load 2402 the impedance of which is equal to surge impedance $Z_0$ of the line. When the network is placed in proximity to the line, forward and back waves will be introduced therein as indicated by the arrows. Since the transmission line is terminated in its surge impedance at 2402 the forward wave travelling thereto will not be reflected. In the other direction, however, a short-circuiting bar 2403 is provided across the transmission line. Consequently the back wave B will be reflected at this point back toward the termination 2402. By adjusting the short-circuiting bar 2403 this reflected wave may be brought into any desired phase with the forward wave. Thus, for example, these two waves may be brought in phase with each other and the overall transfer coefficient between the line and the network increased or they may be made to oppose each other and the transfer coefficient decreased. When the coupled network is of such form that its transfer coefficients $S_1$ and $S_2$ are equal as, for example, is the case when the network has the form shown in Fig. 24, the opposition of the two waves results in mutual cancellation so that the overall transfer coefficient in this case is substantially zero and consequently very large currents in the network produce substantially no current in the load. At all other positions of the shorting bar the transfer coefficient is not zero and may be made to have a desired value by adjusting the spacing between the network and the line.

Figure 23:
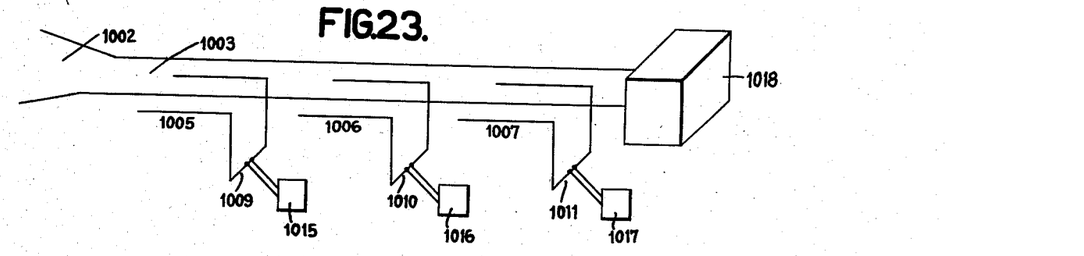
Fig. 23 illustrates coupled networks used as selective receiving filters.
Figure 25:
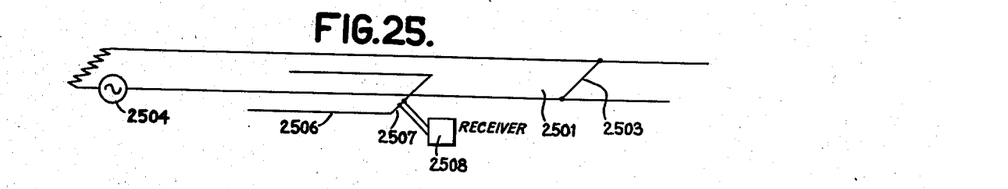

The system outlined above may likewise be applied to reception in accordance with the general reciprocity law. Accordingly a system such as shown in Fig. 25 may be used. In this figure 2501 represents the transmission line and 2506 the coupled section. However, in place of the source of high frequency energy coupled to the short circuiting bar 2507, a receiver 2508 is coupled thereto. At some portion of the transmission line near the forward end is introduced a high frequency from a source 2504. The short-circuiting bar 2503 may be used to adjust the coupling in accordance with the principles outlined above. Since efficient transfer of energy from the coupled network into the receiver will take place only at one frequency for which proper adjustments described above were made it is clear that this arrangement will tend to act inefficiently at all frequencies with the exception of the one for which it is adjusted and some of its harmonics. The arrangement of Fig. 24 is also useful when it is employed as shown in Fig. 23 in connection with one or more similar arrangements each operating at a different frequency. In this figure 1002 represents an antenna tuned so as to receive or transmit a number of different radio frequencies. Connected to antenna 1002 is a transmission line 1003 terminated at its distant end by some load 1018 which may be a receiver, or transmitter, or some impedance, for example, a short-circuiting bar. At various points along the line are coupled networks 1005, 1006 and 1007, respectively. Network 1005 is so adjusted and the receiver 1015 is connected across the wires of the network at such points as to effect transfer of energy at the received frequency. Under these conditions only the frequency and source of its harmonics desired will be received on receiver 1015. This may be clearly understood when it is considered that a network such as 1005 will be coupled to the line at substantially only the frequency to which it is adjusted and will, in effect, be substantially fully uncoupled for the other frequencies. The units 1006, 1007 are similarly adjusted with respect to distance from the remote point of line 1003 and for reception of the respective frequencies to which it is desired that they be effective for reception. Thus receivers 1016, 1017 are coupled across shorting bars 1010, 1011 similarly to the coupling of 1015 across 1009. If it is desired to receive other frequencies which the antenna 1002 is capable of receiving, it is merely necessary to couple other networks to transmission line 1003 at the proper point, adjust these networks for the desired frequency, and connect to them a receiving apparatus. The same arrangement may be employed when it is desired to connect to the same load several sources of high frequency power. In this case the arrangement of Fig. 23 may be used substantially as just described with the only exception that the receivers shown in this figure are to be replaced by transmitters.

The arrangement of Fig. 23 may also be employed for the purpose of transmitting and receiving on the same antenna. In this case 1018 may be a transmitter and operating at some frequency $f_4$, while 1015, 1016, 1017 are receivers receiving frequencies $f_1$, $f_2$, $f_3$, different from $f_4$. Actual tests with such an arranfiement were performed and it was found possible, for example, to transmit about 5 kw. at frequency 18,780 while receiving satisfactorily a signal of frequency 17,140 kc. coming from a station located 2500 miles away.

Figure 26:
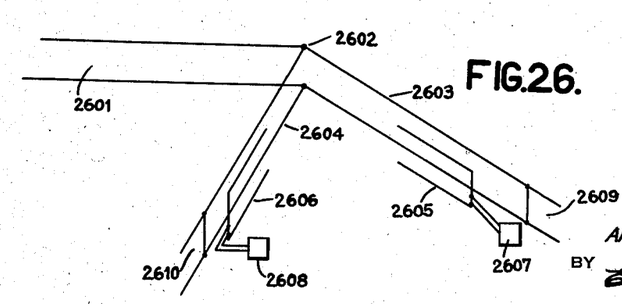
Fig. 26 illustrates two network circuits such as shown in Fig. 25 coupled to a transmission line.

In Fig. 26 I have shown one special application of the principle as disclosed in Figs. 24 and 25. In this figure 2601 represents a transmission line upon which are waves of two frequencies $f_1$ and $f_2$. This transmission line is branched at point 2602 into two lines 2603 and 2604. Coupled to line 2603 is a network 2605 and to this network is connected a receiver 2607, the transmission line branch 2603 is terminated by a short-circuiting bar 2609. Network 2605 and the short-circuiting bar 2609 may be adjusted as described above in connection with Fig. 24 to receive waves of one frequency, for example, frequency $f_1$. In transmission line branch 2604 is provided a short-circuiting bar 2610 similar to 2609 and coupled to this line is a network 2606 to which is connected a receiver 2608. The network 2606 is tuned to frequency $f_2$ and is adjusted with respect to short-circuiting bar 2610 so as to receive waves of frequency $f_2$. The same arrangement shown in Fig. 26 may be employed for connecting two transmitters to the same antenna. This may be accomplished by using transmitters instead of receivers at 2607, 2608.

In selecting lengths of branch lines 2603, 2604 care must be exercised to avoid such lengths as will result in one of these branch lines effectively short-circuiting the other. For example, if the length of line 2604 from 2602 to 2610 is made equal to a half wavelength of the frequency received or transmitted by 2607 the arrangement will not function satisfactorily. In order to avoid such a condition and insure the least amount of interference between the two branch lines each line may be made, for example, an odd number of quarter waves long at the frequency for which the other branch is designed.

Figure 27:
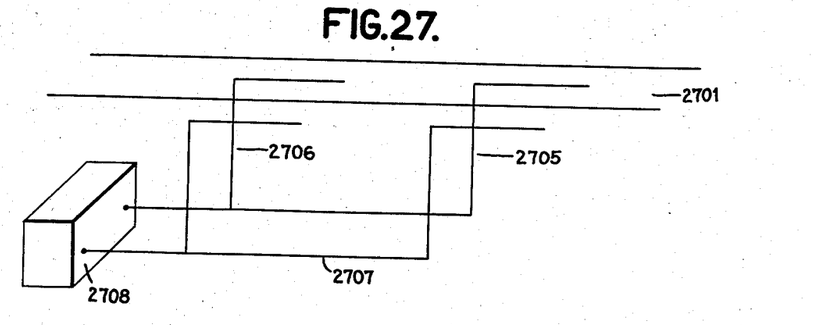
Fig. 27 illustrates another form of my invention wherein the coupled networks have a unidirectional effect upon a line.

In Fig. 27 I have illustrated another modification of my invention. In this figure 2701 represents a transmission line and to this transmission line are coupled a network comprising elements 2705 and 2706. These elements are similarly arranged with respect to the line and are coupled to the transmission line 2701 at points separated a distance equal to substantially a quarter wavelength or an odd multiple thereof.

The two elements 2705 and 2706 are connected to a common transmission line 2707 at points also separated by a distance substantially equal to an odd number of quarter waves and this transmission line is connected to a transmitter or receiver 2708. The coupled network of Fig. 27 is an example of a network which has $S_1$ different from $S_2$ and in accordance with the theory considered in the early part of this specification when energized by a source of E. M. F. at 2708 produces in the transmission line 2701 two traveling waves, one traveling from left to right and one traveling from right to left the amplitudes of which are unequal. The ratio of the amplitudes of the two traveling waves is large when the degree of coupling between the line and the network is small and becomes greater as the coupling is decreased. On the contrary when coupling is very close the two amplitudes are nearly equal. This peculiar unidirectional property of this network enables one to differentiate between waves traveling in a transmission line from left to right and from right to left. If 2708 in Fig. 27 represents a receiver and the coupled network shown in this figure is loosely coupled to the transmission line 2701 then the energy which is received is abstracted mostly from waves which travel along the transmission line from right to left.

Figure 28:
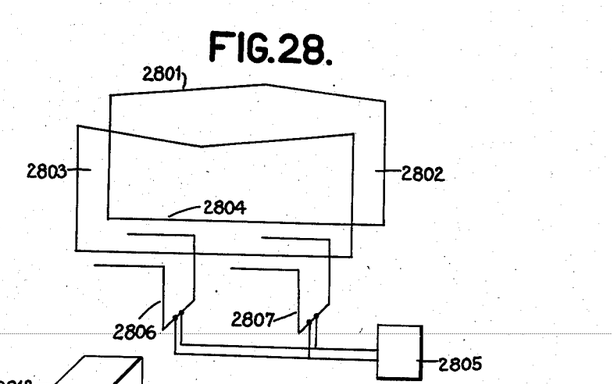
Fig. 28 illustrates the use of such uni-directional selective circuits as shown in Fig. 27, for coupling a receiver to an antenna for response in only one direction.

In Fig. 28 there is shown an arrangement in which a network of Fig. 27 is used to make an otherwise by-directional antenna unidirectional. In this figure 2801 is Rhombic antenna both ends of which are interconnected through transmission lines sections 2803, 2804, 2802. A network similar to that described in connection with Fig. 27 is coupled to section 2804.

The electromagnetic waves in ether coming from right to left produce in the antenna conductors traveling waves which also travel from righ to left. These waves continue along section 2803 in downward direction and thence along 2804 in the direction from left to right. In accordance with the principles explained in connection with Fig. 27 these waves will produce a greater effect in the receiver than waves of equal amplitude traveling in 2804 from right to left. The latter traveling waves may be produced by ether waves traveling in space from left to right. Accordingly the receiver will be relatively more sensitive to ether right to left and less sensitive to waves coming from the opposite direction so that the whole arrangement may be employed as a unilaterally directional receiving system.

Figure 29:
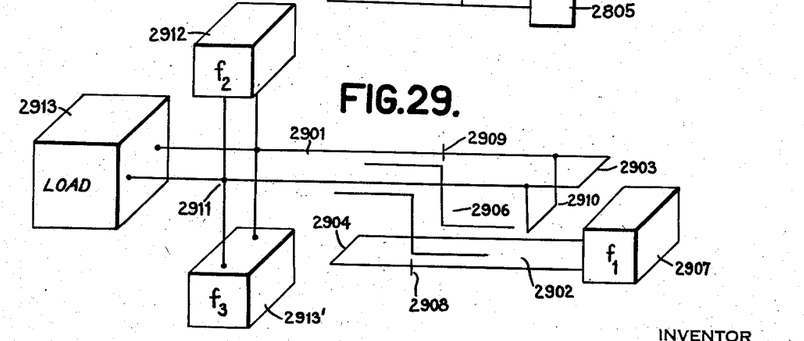
Fig. 29 illustrates a special application of the coupled networks system such as illustrated in Figs. 24 and 25.

In Fig. 29 is shown a still further application of coupled networks. In this figure are shown two transmission lines 2901 and 2902 provided with short-circuiting bars 2903 and 2904, respectively. Between these two transmission lines and coupled to each is provided a network section 2906. The dimensions of network 2906 are so adjusted that its reactance is small at frequency $f_1$ of source of high frequency power 2907. The spacings between network 2906 and lines 2901 and 2904 are sufficiently close so that currents in line 1902 can produce currents in the network and the currents in the network can induce currents in line 1901. Under these circumstances energy from source 2907 can be transferred into line 2901 and vice versa the energy from said line can be transferred into 2907. This transfer of energy will be efficient only at frequency $f_1$ and some of its harmonics. When the transfer coefficients between the network 2906 and lines 2901 and 2902 are made comparatively large so as to reduce the currents in the network and therefore the losses therein a certain amount of power can pass from line 2901 into source 2907 at frequencies other than $f_1$ and greatly differing therefrom. In order to reduce this transfer of power at two other specified frequencies $f_2$ and $f_3$ shorting bars 2904 and 2903 may be installed in such positions along lines 2902 and 2901 as to impede the passage of these frequencies. Thus shorting bar 2904 may be positioned at a distance equal to a whole number of half wavelengths of frequency $f_3$ from the point 2908 along line 2902 and similarly shorting bar 2903 may be located at a distance equal to a whole number of half wavelengths of frequency $f_2$ from the point 2909 just above the other bend in network 2906.

In accordance with the principles discussed in connection with other figures in this specification the effect of the shorting bars so positioned will be to impede the passage power from the network and into the line.

The auxiliary section of line 2910 is provided for the purpose of making the impedance of line 2901 measured at junction 2911 very high at frequency $f_3$. At the same time the impedance of line 2911 is made very high at frequency $f_2$ by making its total length measured between 2911 and 2903 equal to an odd number of quarter wavelengths at this latter frequency. The auxiliary section 2910 does not interfere with this result when it is connected at a distance equal to a whole number of half wavelengths of frequency $f_2$ from shorting bar 2903.

At junction 2911 there may be connected similar systems adjusted one to supply waves for frequency $f_2$ and to impede the passage of frequencies $f_1$ and $f_3$ into the source of waves of frequency $f_2$ and the other similarly adjusted to pass and to impede frequencies $f_3$ and $f_1$, $f_2$ respectively.

The arrangement of Fig. 29 may be employed for operating three sources of high frequency power each producing waves of different frequencies and each delivering power into the common load 2913 and without interfering with the other two sources.

What I claim is:

1. In a high frequency transmission system, a transmission line, means for propagating high frequency waves along said line, and means for influencing the transmission of said waves along said line, comprising a conductor coupled to said line and conductively separated therefrom, at least one portion of said conductor being coupled to said line differently from another portion whereby electrical dissymmetry is produced in said conductor and a desired reaction is produced on said line.

2. A high frequency transmission system in accordance with claim 1, wherein at least a portion of said conductor is positioned at an angle to said transmission line.

3. A high frequency transmission system in accordance with claim 1, wherein at least one end of said conductor is positioned at an angle to said transmission line.

4. A high frequency transmission system in accordance with claim 1, wherein one portion of said conductor is substantially parallel to said transmission line and another portion is at an angle thereto.

5. A transmission system comprising, a source of radio frequency energy, a load, a transmission line connecting said source and said load, said load being of such a value that standing waves are produced on said line, and means for modifying said standing waves comprising a network having reactance, coupled to said line and conductively separated therefrom, said network having a portion coupled to said line differently from another portion, and being positioned at a point along said line dependent upon the reactance of said network and the location of standing wave maxima along said line.

6. In combination, a transmission line, means for introducing waves of a plurality of frequencies onto said transmission line and means coupled to said line for modifying the propagation of at least one of said waves without affecting the propagation of the other waves along said line, comprising a network conductively separated from said transmission line, at least one portion of which is coupled to said line differently from another portion of said network whereby electrical dissymmetry is produced at at least one of said frequencies.

7. The combination according to claim 6 wherein network means are provided for each of said waves introduced into said line, and said network means are designed to match the transmission line to a load at each or all of said frequencies.

8. In combination, a transmission line, means for propagating high frequency waves along said line, means at one end of said line producing reflections of said waves in said transmission line, means for selectively transferring waves from said line to other apparatus, comprising a conductor coupled to said line at a point depending on the wavelength to be transferred and the location of standing wave maxima produced by the reflections of said second named means, the said conductor being designed with respect to said wavelength, one portion of said conductor being coupled to said line differently from another portion whereby electrical dissymmetry is produced in said conductor, and high frequency apparatus connected to said conductor.

9. In a high frequency transmission system, a transmission line, means for propagating high frequency waves along said line, and means for influencing the transmission of said waves along said line, comprising a conductor coupled to said line and conductively separated therefrom, at least one portion of said conductor being coupled to said line differently from another portion whereby electrical dissymmetry is produced in said conductor and a desired reaction is produced on said line, and a translating means coupled to said conductor.

10. In combination, a transmission line, means for propagating high frequency waves along said line, means at one end of said line producing reflections of said waves in said transmission line, means for selectively transferring waves between said line and other apparatus, comprising a conductor inductively coupled to said line at a point depending on the wavelength to be transferred and the location of standing wave maxima produced by the reflections of said second named means, the said conductor being designed with respect to said wavelength, one portion of said conductor being coupled to said line differently from another portion whereby electrical dissymmetry is produced in said conductor, and high frequency translating apparatus connected to said conductor.

11. In a high frequency transmission system, a transmission line, means for propagating high frequency waves along said line and means for producing a phase change in the waves propagated along said line, comprising a conductor inductively coupled to said line to introduce disturbances influencing said propagated waves, and another conductor inductively coupled to said line and spaced from said first named conductor for introducing disturbances counteracting the influence produced by said first conductor, at least a portion of each of said conductors being coupled to said line differently from another portion of each of said conductors whereby electrical dissymmetry is produced in said conductors and the desired reaction occurs.

12. In a high frequency transmission system, a transmission line, means for propagating high frequency waves along said line, and means for influencing the transmission of said waves along said line, comprising a conductor conductively separated from and coupled to said line and physically symmetrical therewith and means comprising a phase shifting means connected in said line adjacent to one portion of said conductor whereby at least one portion of said conductor is coupled to said line differently from another portion, and electrical dissymmetry is produced in said conductor and a desired reaction is produced on said line.

13. In a high frequency transmission system, a transmission line adapted to operate at a given frequency, a wave translating device and means for coupling said device to said line comprising two conductors spaced apart a quarter of a wave length at said frequency, at least one portion of each of said conductors being coupled to said line differently from another portion whereby electrical dissymmetry is produced in said conductor, and means for connecting said two conductors to said wave translating device, whereby translation of energy substantially in one direction only along said line takes place.

14. A high frequency system, comprising a high frequency transmission line adapted to carry waves of a particular frequency, high frequency translating apparatus, and means for coupling said translating means to said transmission line at said particular frequency comprising, a conductor coupled to said transmission line and spaced therefrom, said conductor being tuned to said particular frequency and coupled to said transmission line differently at one end than at the other and means connecting said translating means to said conductor.

15. A high frequency system according to claim 14 in which said translating means comprises a receiving apparatus.

16. A high frequency system according to claim 14 in which said translating means comprises a transmitting apparatus.

17. A high frequency system comprising a transmission line adapted to carry energy at a plurality of different radio frequencies, a corresponding plurality of high frequency translating devices each designed to translate one of said radio frequencies, and separate means connected to each translating device for coupling said devices to said transmission line at its radio frequency while maintaining substantial isolation at other frequencies, each separate means comprising a conductor conductively spaced from said line, a portion of said conductor being coupled to said transmission line differently than another portion thereof, and being so designed and related to said transmission line as to function substantially at only said radio frequencies of its associated translation device.

18. A high frequency system comprising a high frequency transmission line, for carrying a plurality of radio frequencies, a single frequency high frequency translating device, a second transmission line connected to said translating device, means for interconnecting said first and second transmission lines at said single frequency, comprising a pair of conductors spaced from each transmission line and coupled differently at one portion from another portion to each of said transmission lines, said conductors being adjusted to respond only to said single radio frequency and being positioned with respect to said transmission lines at a point dependent upon said single radio frequency.

19. A high frequency transmission system comprising a high frequency transmission line for transmitting a first and a second high frequency, two transmission line branches connected to said transmission line at a point thereon, a short circuiting means across one of said branch lines at a distance equal to an odd multiple of a quarter-wave length of said first frequency, a second short circuiting means across the other branch line at a distance equal to an odd multiple of a quarter-wave length of said second frequency from said transmission line translating apparatus for said first and second frequencies and means for coupling each of said translating means to said transmission line comprising a conductor spaced from each of said branch lines and coupled thereto differently in one portion than in another portion at a point intermediate the short circuiting bar and the transmission line, and coupled to the respective translating means, said conductor for said second translating device being designed with respect to said second frequency and coupled to said one branch line, and the said conductor for said first translating device being designed with respect to said first frequency and coupled to said second branch line.

ANDREW ALFORD.